United States Patent
Komiyama et al.

(10) Patent No.: US 7,055,636 B2
(45) Date of Patent: Jun. 6, 2006

(54) DRIVE CONTROL DEVICE FOR HYBRID VEHICLE

(75) Inventors: Susumu Komiyama, Yokohama (JP); Hideaki Inoue, Yokohama (JP); Hiroshi Iwano, Yokosuka (JP); Ichiro Yamaguchi, Yokosuka (JP); Taketora Negome, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 80 days.

(21) Appl. No.: 10/828,288

(22) Filed: Apr. 21, 2004

(65) Prior Publication Data
US 2004/0251065 A1    Dec. 16, 2004

(30) Foreign Application Priority Data
May 9, 2003    (JP)    ............................ 2003-131455

(51) Int. Cl.
*B60K 6/04*    (2006.01)

(52) U.S. Cl. .................... 180/65.2; 180/65.3; 180/65.4; 903/940

(58) Field of Classification Search ............... 180/65.1, 180/65.2, 65.3, 65.4
See application file for complete search history.

(56) References Cited

U.S. PATENT DOCUMENTS

| | | | | |
|---|---|---|---|---|
| 5,846,155 A | * | 12/1998 | Taniguchi et al. | ............. 477/2 |
| 6,462,551 B1 | * | 10/2002 | Coates et al. | ............... 324/431 |
| 2002/0062183 A1 | * | 5/2002 | Yamaguchi et al. | ........... 701/22 |

FOREIGN PATENT DOCUMENTS

JP    2002-171604 A    6/2002

* cited by examiner

*Primary Examiner*—Christopher P. Ellis
*Assistant Examiner*—John Walters
(74) *Attorney, Agent, or Firm*—Foley & Lardner LLP

(57) ABSTRACT

A target driving power is calculated in accordance with the operating condition, a fuel consumption rate per power unit is calculated at all the possible operating points of an engine (1) and a drive motor (5) to realize the target driving power, a target fuel consumption rate is set on the basis of the operating condition, and an operating point of the engine (1) and drive motor (5) at which a fuel consumption rate that is equal to the target fuel consumption rate can be realized is searched. When an operating point at which a fuel consumption rate that is equal to the target fuel consumption rate can be realized is not found, the fuel consumption rate relating to driving power is corrected with only the fuel consumption rate relating to electric power for charging a battery device set at a predetermined value which is smaller than the actual fuel consumption rate, an operating point at which the fuel consumption rate relating to driving power reaches a minimum is selected, and the engine (1) and drive motor (5) are controlled to achieve the selected operating point.

18 Claims, 9 Drawing Sheets

DRIVE CONTROL DEVICE FOR HYBRID VEHICLE

TECHNICAL FIELD OF THE INVENTION

The present invention relates to drive control of a hybrid vehicle.

BACKGROUND OF THE INVENTION

JP2002-171604A, published by the Japan Patent Office in 2002, discloses technology for determining the operating point (rotation speed and torque) of an engine in a hybrid vehicle so as to ensure that a fuel consumption rate per power unit (=fuel consumption amount per power unit) matches a target value. In this prior art, the engine is operated at an operating point at which the fuel consumption rate per power unit matches a preset target value, and the surplus engine power is converted to electric power to charge the battery. In cases where no such operating point exists, the engine is stopped and the vehicle is driven by a motor.

The electric power of the battery is charged while operating the engine at the operating point at which the fuel consumption rate per power unit matches the target value, and hence by determining the engine operating point in the manner described in the prior art, the vehicle is capable of running at the target fuel consumption rate per power unit at all times, whether running by engine while charging the battery or running by motor while discharging the battery.

SUMMARY OF THE INVENTION

In a series hybrid vehicle, the same loss occurs in the drive motor whether the electric power supplied to the drive motor is generated by a combination of the engine and a motor generator or supplied directly from the battery. Hence the fuel consumption rate per power unit can be defined in relation to the electric power that is supplied to the drive motor, and the fuel consumption rate per power (electric power) unit when the electric power of the battery is used is equal to the fuel consumption rate per power (electric power) unit when the battery is charged. As a result, when electric power is supplied from the battery, the vehicle is capable of running at the target fuel consumption rate per power (electric power) unit even when an operating point which is equal to the target fuel consumption rate per power unit does not exist among all of the operating points existing when the engine is operated.

In a parallel hybrid engine, however, the driving power that is transmitted from the tires to the road surface is output directly from the engine or from the drive motor. Hence the fuel consumption rate per power unit cannot be defined in relation to the electric power that is supplied to the drive motor, and must instead be defined in relation to the driving power that is transmitted to the road surface from the tires. As a result, when an operating point which is equal to the target fuel consumption rate per power (driving power) unit does not exist among all of the operating points existing when the engine is operated, the vehicle is unable to run at the target fuel consumption rate per power (driving power) unit even when running only by drive motor as in the prior art. This is due to the fact that the fuel consumption rate per power (driving power) unit when running only by drive motor is not equal to the fuel consumption rate per power (electric power) unit when charging the battery, and hence loss occurring in the drive motor is added thereto.

Further, the operating point that should be selected when no operating point at which the target fuel consumption rate per power unit is reached exists in a parallel hybrid vehicle is not clarified in the prior art described above.

It is therefore an object of this invention to enable an appropriate operating point to be selected in a parallel hybrid vehicle when no operating point at which the target fuel consumption rate per power unit is reached exists.

In order to achieve above object, this invention provides a parallel hybrid vehicle comprising an engine and a drive motor capable of transmitting power to an output shaft; a transmission interposed between the output shaft and the engine; a battery device electrically connected to the drive motor; and a controller. The controller is configured to calculate a target driving power in accordance with an operating condition of the vehicle; calculate a fuel consumption rate per power unit at all the possible operating points of the engine and drive motor to realize the target driving power; set a target fuel consumption rate on the basis of the vehicle operating condition; search an operating point of the engine and drive motor at which a fuel consumption rate that is equal to the target fuel consumption rate can be realized; when an operating point at which a fuel consumption rate that is equal to the target fuel consumption rate can be realized has been found, control the engine and drive motor to achieve the operating point; and when an operating point at which a fuel consumption rate that is equal to the target fuel consumption rate can be realized is not found, correct the fuel consumption rate relating to driving power with only the fuel consumption rate relating to electric power for charging the battery device set at a predetermined value which is smaller than the actual fuel consumption rate, select an operating point at which the fuel consumption rate relating to driving power reaches a minimum, and control the engine and drive motor to achieve the selected operating point.

According to an aspect of this invention, this invention provides a parallel hybrid vehicle comprising a transmission to which an engine and a motor generator are connected; a drive motor connected to an output shaft of the transmission or a drive shaft of the vehicle; a battery device which is electrically connected to the drive motor and the motor generator; and a controller. The controller is configured to calculate a target driving power in accordance with an operating condition of the vehicle; calculate a fuel consumption rate per power unit at all the possible operating points of the engine, motor generator, and drive motor to realize the target driving power; set a target fuel consumption rate on the basis of the vehicle operating condition; search an operating point of the engine, motor generator, and drive motor at which a fuel consumption rate that is equal to the target fuel consumption rate can be realized; when an operating point at which a fuel consumption rate that is equal to the target fuel consumption rate can be realized has been found, control the engine, motor generator, and drive motor to achieve the operating point; and when an operating point at which a fuel consumption rate that is equal to the target fuel consumption rate can be realized is not found, correct the fuel consumption rate relating to driving power with only the fuel consumption rate relating to electric power for charging the battery device set at a predetermined value which is smaller than the actual fuel consumption rate, select an operating point at which the fuel consumption rate relating to driving power reaches a minimum, and control the engine, motor generator, and drive motor to achieve the selected operating point.

According to another aspect of this invention, this invention provides a parallel hybrid vehicle comprising a motor generator connected to an engine; a battery device for storing electric power generated by the motor generator; and a controller. The controller is configured to calculate a fuel consumption rate per charging power unit at all the possible operating points of the engine and motor generator when the vehicle is stationary; set a target fuel consumption rate on the basis of an operating condition of the vehicle; search an operating point of the engine and motor generator at which a fuel consumption rate that is equal to the target fuel consumption rate can be realized; when an operating point at which a fuel consumption rate that is equal to the target fuel consumption rate can be realized has been found, control the engine and motor generator to achieve the operating point; and when an operating point at which a fuel consumption rate that is equal to the target fuel consumption rate can be realized is not found, determine a fuel consumption rate for realizing each operating point with the fuel consumption rate relating to the charging power at each operating point set at a predetermined value which is smaller than the actual fuel consumption rate, select an operating point at which the fuel consumption rate reaches a minimum, and control the engine and motor generator to achieve the selected operating point.

The details as well as other features and advantages of this invention are set forth in the remainder of the specification and are shown in the accompanying drawings.

DESCRIPTION OF THE PREFERRED EMBODIMENTS

Figure 1:
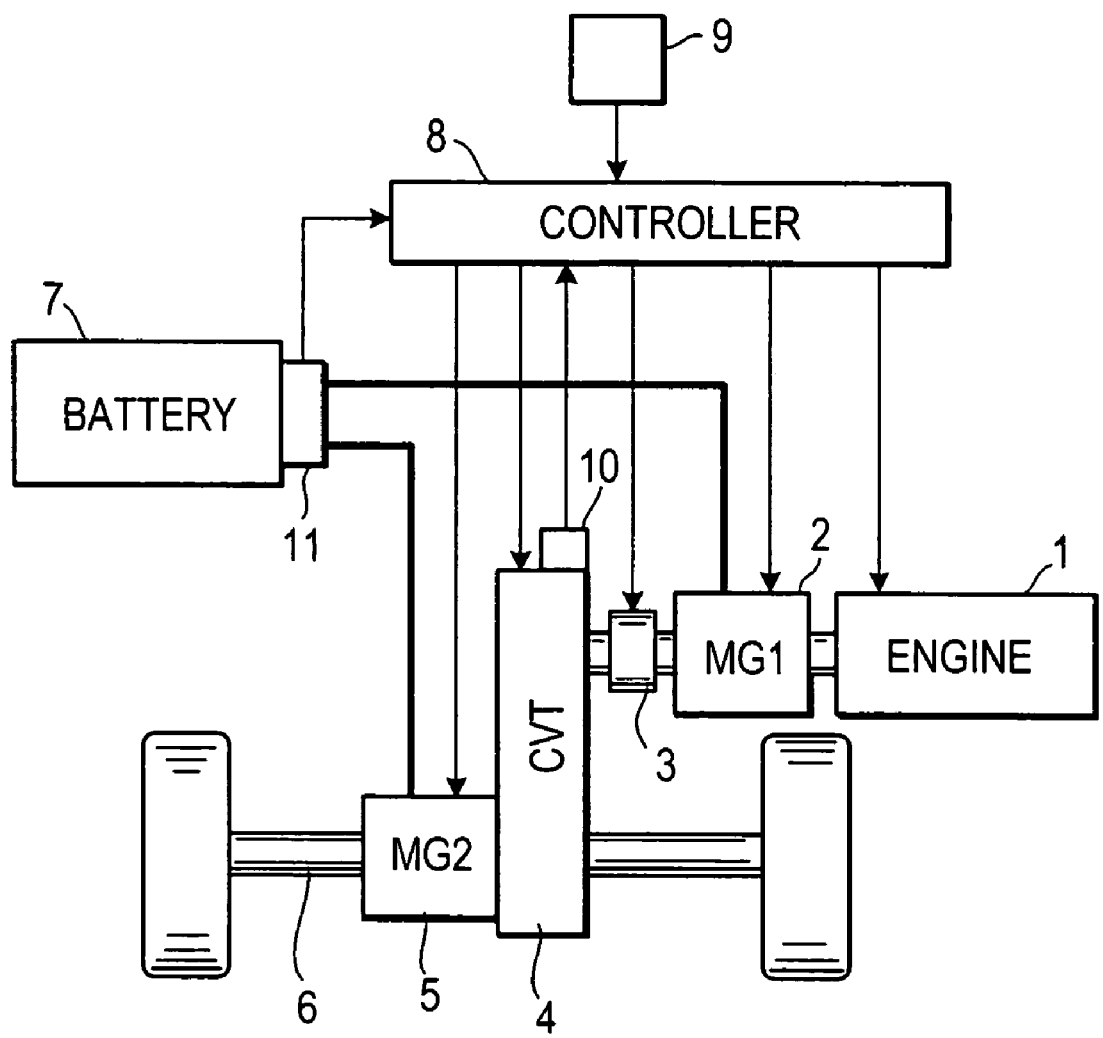
FIG. 1 is a schematic diagram of a parallel hybrid vehicle according to this invention.

Referring to FIG. 1 of the drawings, in a parallel hybrid vehicle according to this invention, an output shaft of an engine 1 is connected to a rotation shaft of a motor generator 2, and the rotation shaft of the motor generator 2 is connected to an input shaft of a transmission 4 via a clutch 3. A rotation shaft of a drive motor 5 is connected to an output shaft of the transmission 4. The transmission 4 is constituted by a continuously variable transmission mechanism and a differential mechanism. Drive wheels are attached to the output shaft (axle 6) of the transmission 4. The motor generator 2 and drive motor 5 are electrically connected to a battery 7.

A controller 8 is constituted by one or a plurality of microprocessors, memory, an input/output interface, and so on. The controller 8 may be constituted by a plurality of controllers. The controller 8 receives an accelerator depression amount (APS) signal from an accelerator sensor 9, a transmission input shaft rotation speed (rNti) signal and a transmission output shaft rotation speed (rNto) signal from a rotation speed sensor 10, a battery input/output power signal from an electric power sensor 11, and so on, calculates a target engine torque, a target motor generator torque, a target drive motor torque, and a target speed ratio on the basis of these signals, and controls the throttle opening of the engine 1, the control current of the motor generator 2, the control current of the drive motor 5, and the transmission 4 on the basis of these target values.

Figure 2:
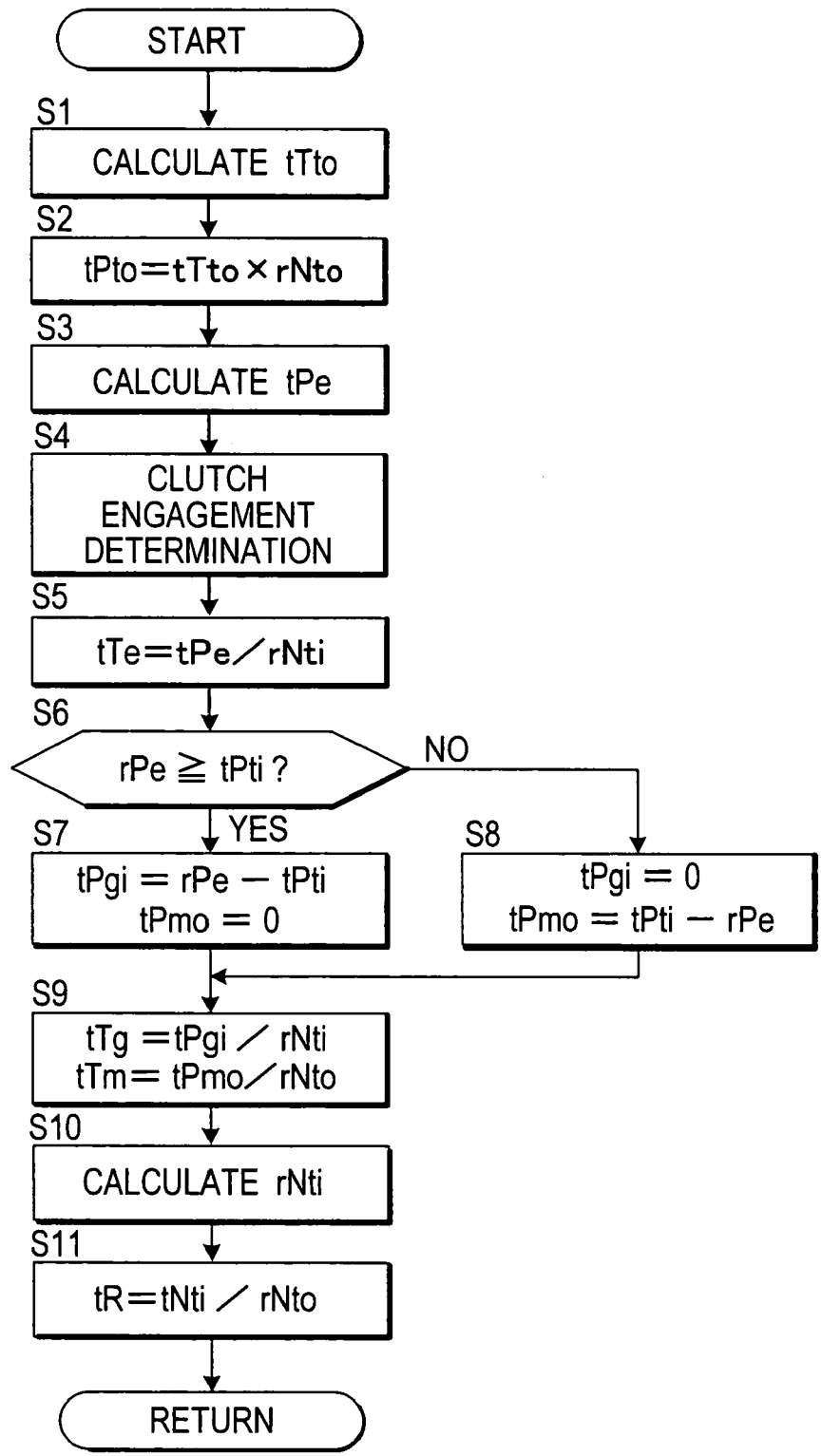
FIG. 2 is a flowchart showing an outline of processing performed by a controller.

FIG. 2 is a flowchart showing an outline of processing that is executed by the controller 8. This flowchart is executed on a predetermined cycle (of several tens of milliseconds, for example).

In a step S1, a target transmission output shaft torque tTto [Nm] is calculated on the basis of the accelerator depression amount APS and the transmission output shaft rotation speed rNto [rad/sec]. More specifically, the target transmission output shaft torque tTto is calculated by referring to a stored map showing the relation of the target transmission output shaft torque tTto to the accelerator depression amount APS and the transmission output shaft rotation speed rNto. The target transmission output shaft torque tTto is a target value for the vehicle driving torque in the axle 6. The transmission output shaft rotation speed is commensurate with the vehicle speed.

In a step S2, the target transmission output shaft torque tTto is multiplied by the transmission output shaft rotation speed rNto to calculate a target transmission output shaft power tPto [W].

In a step S3, a target engine power tPe [W] is calculated on the basis of the target transmission output shaft power tPto and a battery charging state rSOC [%]. This calculation will be described in detail hereinafter.

In a step S4, a determination is made as to whether the clutch 3 is engaged or disengaged on the basis of the target engine power tPe. More specifically, the clutch 3 is determined to be disengaged when the target engine power tPe is zero (the engine is halted), and determined to be engaged at all other times.

In a step S5, the target engine power tPe is divided by the transmission input shaft rotation speed rNti to calculate a target engine torque tTe [Nm]. When the clutch 3 is engaged, the transmission input shaft rotation speed is equal to the engine rotation speed.

In a step S6, a determination is made as to whether or not the actual engine power rPe [W] equals or exceeds a target transmission input shaft power tPti [W]. The actual engine power rPe is the current engine power estimated on the basis of the history of the target engine power tPe and the output response characteristic of the engine 1.

The target transmission input shaft power tPti is obtained by dividing the target transmission output shaft power tPto by a transmission efficiency Et [%] of the transmission 4.

The transmission efficiency Et employs a value determined in accordance with the actual speed ratio rR (=rNti/rNto) of the transmission 4.

If the actual engine power rPe equals or exceeds the target transmission 4 input shaft power tPti in the step S6, the process advances to a step S7, where the target transmission input shaft power tPti is subtracted from the actual engine power rPe to calculate a target motor generator power tPgi [W]. Further, a target drive motor power tPmo [W] is set to zero.

If the actual engine power rPe is smaller than the target transmission input shaft power tPti in the step S6, the process advances to a step S8, where the target motor generator power tPgi is set to zero. Further, the target drive motor power tPmo is calculated by subtracting the actual engine power rPe from the target transmission input shaft power tPti. When the actual engine power rPe is zero, the target transmission input shaft power tPti is provided completely by the power of the drive motor 5 (electric power discharged from the battery). This condition is referred to as EV (Electric Vehicle) running.

In a step S9, the target motor generator power tPgi is divided by the transmission input shaft rotation speed rNti to calculate a target motor generator torque tTg [Nm]. Further, the target drive motor power tPmo is divided by the transmission output shaft rotation speed rNto to calculate a target drive motor torque tTm [Nm].

In a step S10, the target transmission input shaft rotation speed tNti is calculated. tNti is calculated as the rotation speed at an operating point at which the target engine power tPe is realized with optimal efficiency (an optimal fuel consumption rate).

In a step S11, a target speed ratio tR of the transmission 4 is calculated by dividing the target transmission input shaft rotation speed tNti by the transmission output shaft rotation speed rNto.

Figure 3:
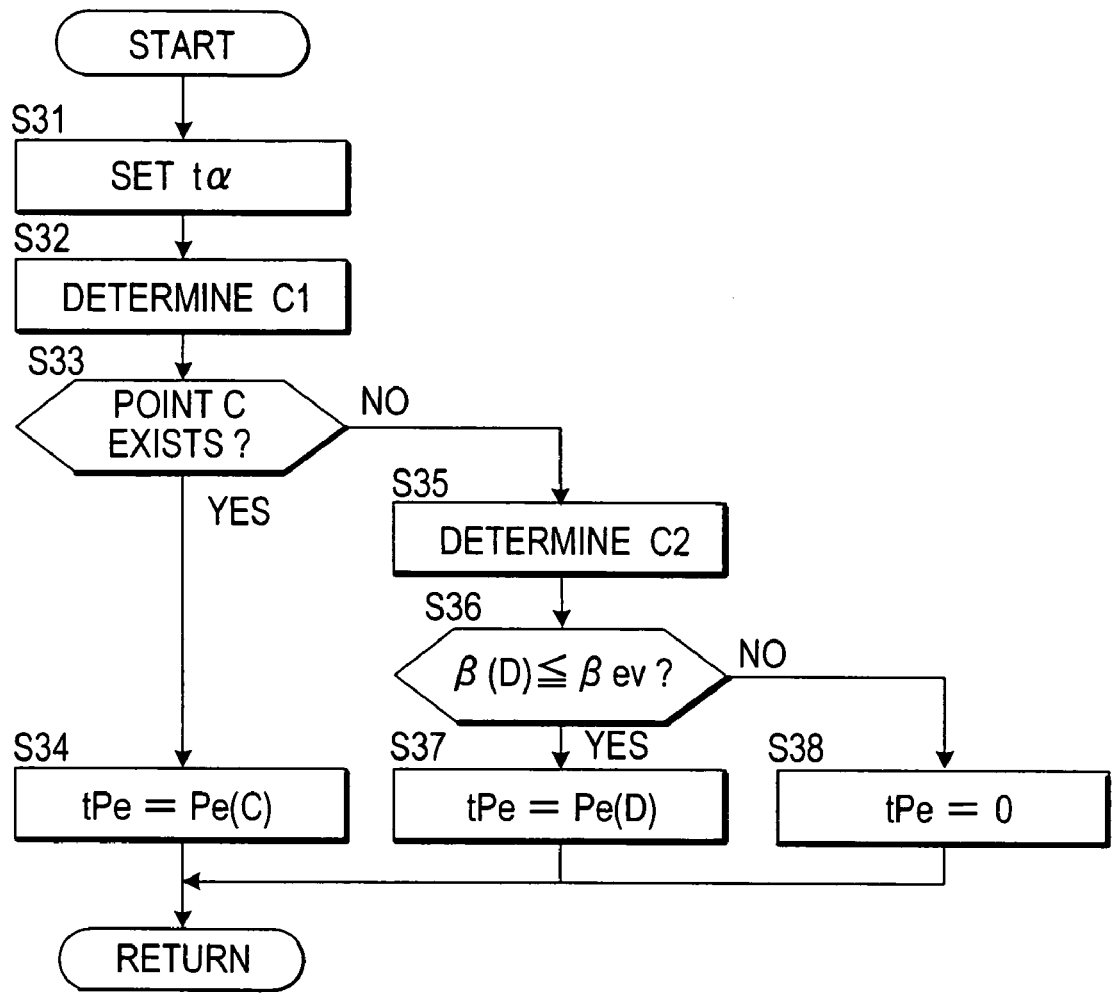
FIG. 3 is a flowchart showing a subroutine of processing to calculate a target engine power.

FIG. 3 shows in detail the processing performed in the step S3.

In a step S31, a target value tα for the efficiency parameter α is set in accordance with the charging state rSOC of the battery 7. More specifically, when the battery charging state rSOC is lower than the target value thereof tSOC (for example, 50%), the efficiency parameter target value tα is increased, and vice versa. The battery charging state rSOC may be calculated from the history of a battery input/output power signal. The efficiency parameter α [cc/J] is a fuel consumption rate [cc] per effective energy unit [J], and in this invention, the effective energy is defined as the sum of the driving energy that is directly involved in the driving of the vehicle and the electrical energy that is charged to the battery 7.

Figure 4:
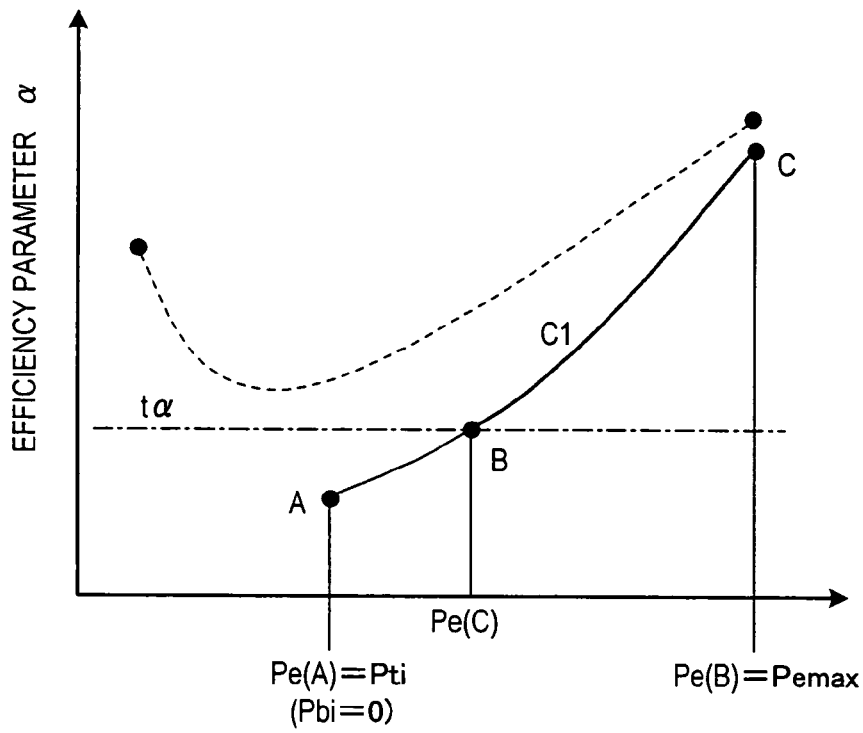
FIG. 4 is an efficiency curve diagram showing the relationship between a target transmission output shaft power and an efficiency parameter α.

In a step S32, an efficiency curve C1 corresponding to the target transmission output shaft power tPto is determined using the current vehicle speed (∝ transmission output shaft rotation speed rNto) as a condition. FIG. 4 shows an example of the efficiency curve C1. The efficiency curve C1 in FIG. 4 can be realized by plotting the efficiency parameter α in relation to the engine power Pe. In the diagram, a point A indicates the efficiency parameter α at an engine power Pe at which the charging power Pbi [W] that is charged to the battery 7 reaches zero, and a point B indicates the efficiency parameter α at a maximum engine power Pemax. The efficiency parameter α on the efficiency curve C1 at an arbitrary engine power Pe is calculated according to the following equation (1).

$$\alpha = F/(Pto+Pbi) \qquad (1)$$

F is the fuel consumption rate [cc/sec] of the engine 1, and employs a value at the engine operating point for realizing the engine power Pe with optimal fuel economy.

The battery charging power Pbi [W] is calculated according to the following equation (2).

$$Pbi = (Pe-Pti) \times Ebi \times Ebi \qquad (2)$$

Ebi is the power generating efficiency [%] of the motor generator 2, and employs a value corresponding to the rotation speed at the engine operating point for realizing the engine power Pe with optimal fuel economy and the motor generator power (=Pe−Pti). Ebi is the charging efficiency [%] of the battery 7, and employs a value corresponding to the current battery condition (charging state SOC, temperature, and so on). Pti is the transmission input shaft power [W], which is obtained by dividing the target transmission output shaft power Pto by the transmission efficiency Et of the transmission 4. The transmission efficiency Et employs a value corresponding to the speed ratio that is obtained by dividing the rotation speed at the engine operating point for realizing the engine power Pe with optimal fuel economy by the transmission output shaft rotation speed rNto.

By calculating the efficiency parameter α for a plurality of engine power Pe values, the efficiency curve C1 can be determined from the point A to the point B.

In a step S33, a determination is made as to whether or not an engine power Pe that matches the efficiency parameter target value tα exists on the efficiency curve C1 in FIG. 4, or in other words whether a point C exists in FIG. 4.

If the point C does exist in the step S33, the process advances to a step S34, where the engine power Pe at the point C is set as a target engine power tPe.

Figure 5:
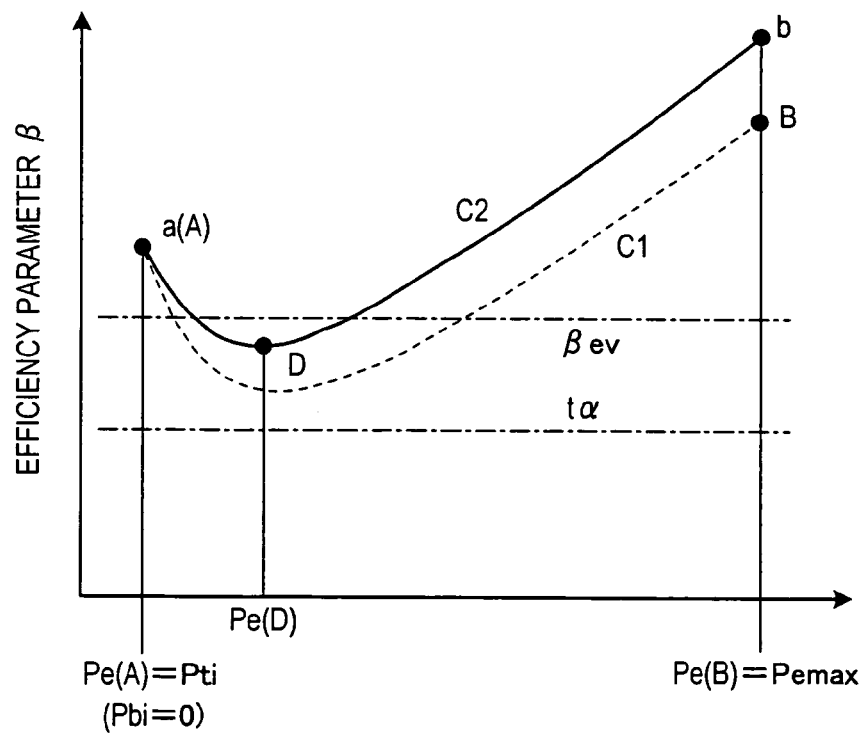
FIG. 5 is an efficiency curve diagram showing the relationship between the target transmission output shaft power and an efficiency parameter β.

If the point C does not exist in the step S33, or in other words if the efficiency curve C1 is as the curve shown by the broken line in FIG. 4, the process advances to a step S35, where an efficiency curve C2 corresponding to the target transmission output shaft power tPto is determined with the current vehicle speed (∝ transmission output shaft rotation speed rNto) as a condition. FIG. 5 shows an example of the efficiency curve C2. The efficiency curve C2 shown in FIG. 5 can be realized by plotting an efficiency parameter β in relation to the engine power Pe. The efficiency parameter β [cc/J] is a fuel consumption rate per driving energy unit.

When calculating the efficiency parameter β on the efficiency curve C2 in FIG. 5, it is assumed that the value of the fuel consumption rate per electrical energy unit charged to the battery 7 is smaller than the actual value, and equal to the value of the target efficiency parameter tα. In other words, it is assumed that tα [cc] of fuel is consumed to charge one [J] of electrical energy. On this condition, the efficiency parameter β on the efficiency curve C2 at an arbitrary engine power Pe is calculated according to the following equation (3):

$$\beta = F1/tPto \qquad (3)$$

F1 is a fuel consumption rate [cc/sec] relating to driving power, which is calculated by subtracting a fuel consumption rate F2 [cc/sec] relating to the battery charging power Pbi from an overall fuel consumption rate F.

The fuel consumption rate F2 is calculated on the basis of the aforementioned assumptions according to the following equation (4):

$$F2 = t\alpha \times Pbi \qquad (4)$$

The battery charging power Pbi is calculated using the same method as that of the step S32.

By calculating the efficiency parameter β for a plurality of engine power Pe values, the efficiency curve C2 can be determined from a point a to a point b in FIG. 5.

In a step S36, a point D, at which the efficiency parameter β is smallest, is located on the efficiency curve C2. Then, a determination is made as to whether or not the efficiency parameter β (D) at the point D is equal to or less than an efficiency parameter βev during EV running. The efficiency parameter βev is calculated according to the following equation (5):

$$\beta ev = t\alpha/(Ebo \times Em) \qquad (5)$$

Ebo is the discharge efficiency [%] of the battery 7, and employs a value corresponding to the current battery condition (charging state SOC, temperature, and so on). Em is the power running efficiency [%] of the drive motor 5, and employs a value corresponding to the drive motor operating condition during EV running (the transmission output shaft rotation speed rNto and the target transmission output shaft power tpto).

If the efficiency parameter β (D) is smaller than the efficiency parameter βev in the step S36, the process advances to a step S37, where the engine power Pe at the point D is set as the target engine power tPe.

If the efficiency parameter β (D) is larger than the efficiency parameter βev in the step S36, the process advances to a step S38, where the target engine power tPe is set to zero.

As described above, first the target engine power tPe is determined such that the fuel consumption rate per effective energy unit matches the target efficiency parameter tα. Then, in cases where no engine operating point which fulfills the conditions exists, a determination is made as to whether EV running is to be performed by comparing the fuel consumption rate per driving energy unit. When performing this comparison for engine running, the efficiency of the electrical energy charged to the battery and the efficiency of the driving energy are treated as individual efficiencies, and the fuel consumption rate per driving energy unit is calculated on the assumption that the fuel consumption rate per electrical energy unit matches the target efficiency parameter tα.

For EV running, it is assumed that the electricity of the battery is charged under the conditions of the target efficiency parameter tα, and hence the fuel consumption rate per driving energy unit is calculated by dividing the target efficiency parameter tα by the efficiency (battery discharge efficiency Ebo and drive motor power running efficiency Em) during the use of battery power.

It should be noted that although the value of the fuel consumption rate per electrical energy unit charged to the battery 7 is assumed to equal the value of the target efficiency parameter tα when determining the efficiency curve C2 in FIG. 5, an efficiency improvement effect can still be achieved to a certain degree when a smaller value than the actual value (efficiency curve C1) is set. A larger value than the target efficiency parameter tα may also be set, and in this case, the EV running selection frequency decreases, whereas the EV running selection frequency increases when a small value is set.

Figure 6:
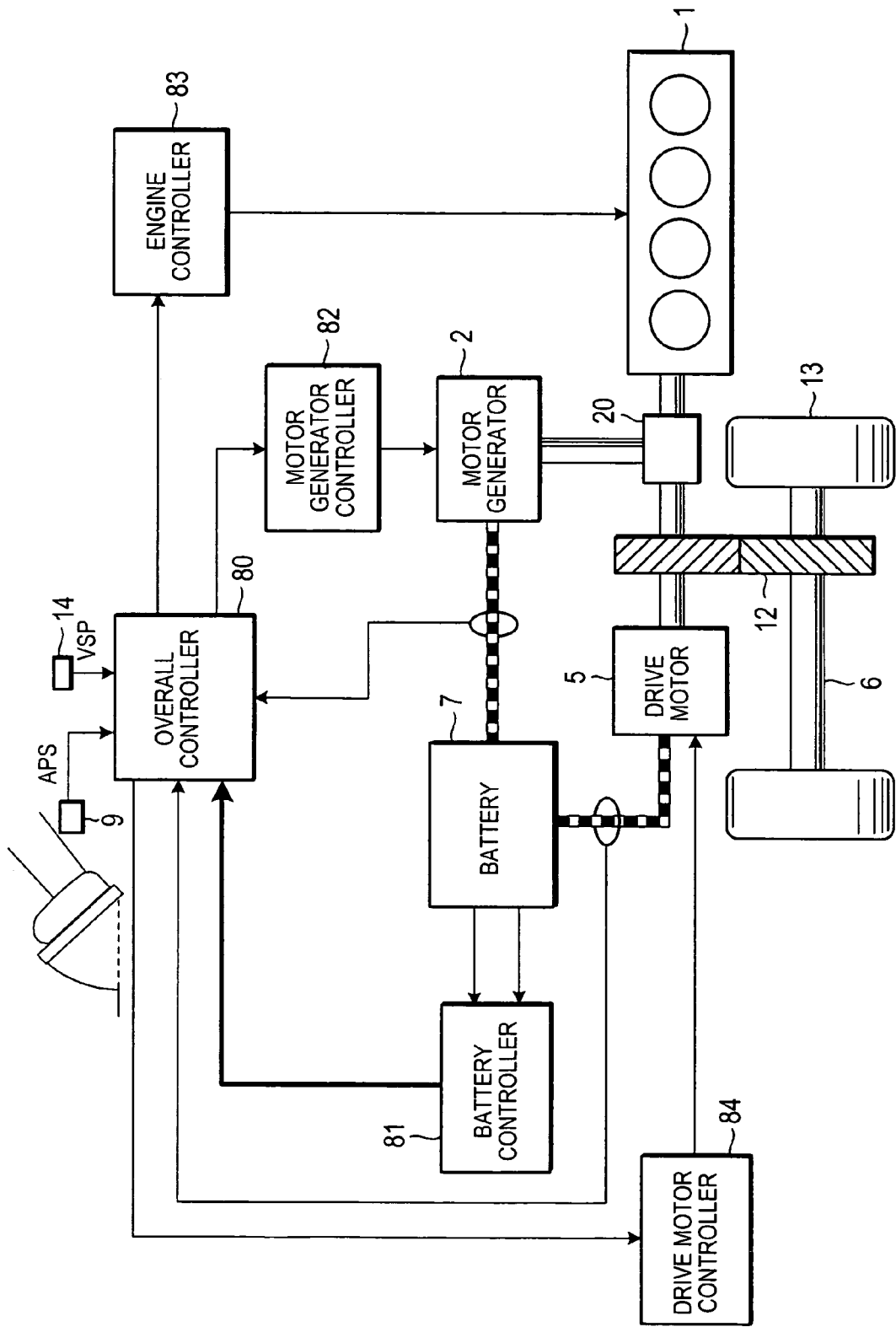
FIG. 6 is a schematic diagram of a hybrid vehicle according to a second embodiment.

FIG. 6 shows a second embodiment.

In the second embodiment, the motor generator 2 and engine 1 are connected by a planetary gear set 20. A power train is mainly constituted by the engine 1, motor generator 2, and drive motor 5, and these components are all mechanically connected by the planetary gear set 20.

Figure 7:
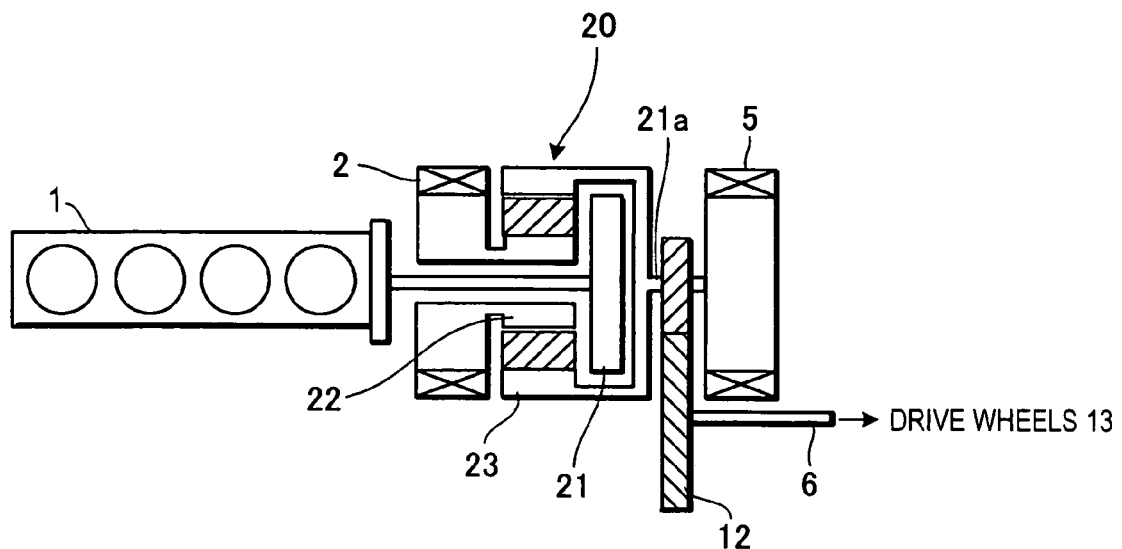
FIG. 7 is a schematic diagram showing a planetary gear set serving as speed changing means in same.

As shown in FIG. 7, in the planetary gear set 20, the engine 1 is connected to a carrier 21 which carries planetary gears, the motor generator 2 is connected to a sun gear 22, and the drive motor 5 is connected to a ring gear 23 via an output shaft 21a. The ring gear 23 is connected to drive wheels 13 via a final gear 12 and the output shaft 6. The drive motor 5 may be connected to the output shaft 6.

The torque of the engine 1 is controlled by having an engine controller 83 control the throttle opening on the basis of an engine torque instruction value which is output from an overall controller 80. The rotation speeds of the engine 1, motor generator 2, and drive motor 5 are illustrated by an alignment chart shown in FIG. 8. The rotation speed of the engine 1 corresponds to the relationship shown in FIG. 8, and is controlled by controlling the rotation speeds of the motor generator 2 and drive motor 5. The ratio between m and n in FIG. 8 correspond to the speed ratio between the sun gear 22 and ring gear 23. The rotation speed of the engine 1 is controlled by controlling the rotation speeds of the motor generator 2 and drive motor 5, and thus the speed ratio between the engine 1 and drive shaft 6 is controlled.

A battery controller 81 detects the voltage V and current I of the battery 7, calculates the battery charging state rSOC and an inputtable/outputtable power, and transmits these values to the overall controller 80. A drive motor controller 84 vector-controls the torque of the drive motor 5 on the basis of a motor torque instruction value from the overall controller 80. Vector control is control in which interference from magnetic flux and torque is eliminated during transitional periods as well as steady periods, whereby control is performed in faithful accordance with the torque instruction value.

Signals from the accelerator sensor 9 which detects the accelerator pedal depression amount APS and a vehicle speed sensor 14 which detects the vehicle speed are input into the overall controller 80. The controllers 80–83 may be constituted by a single controller.

Figure 9:
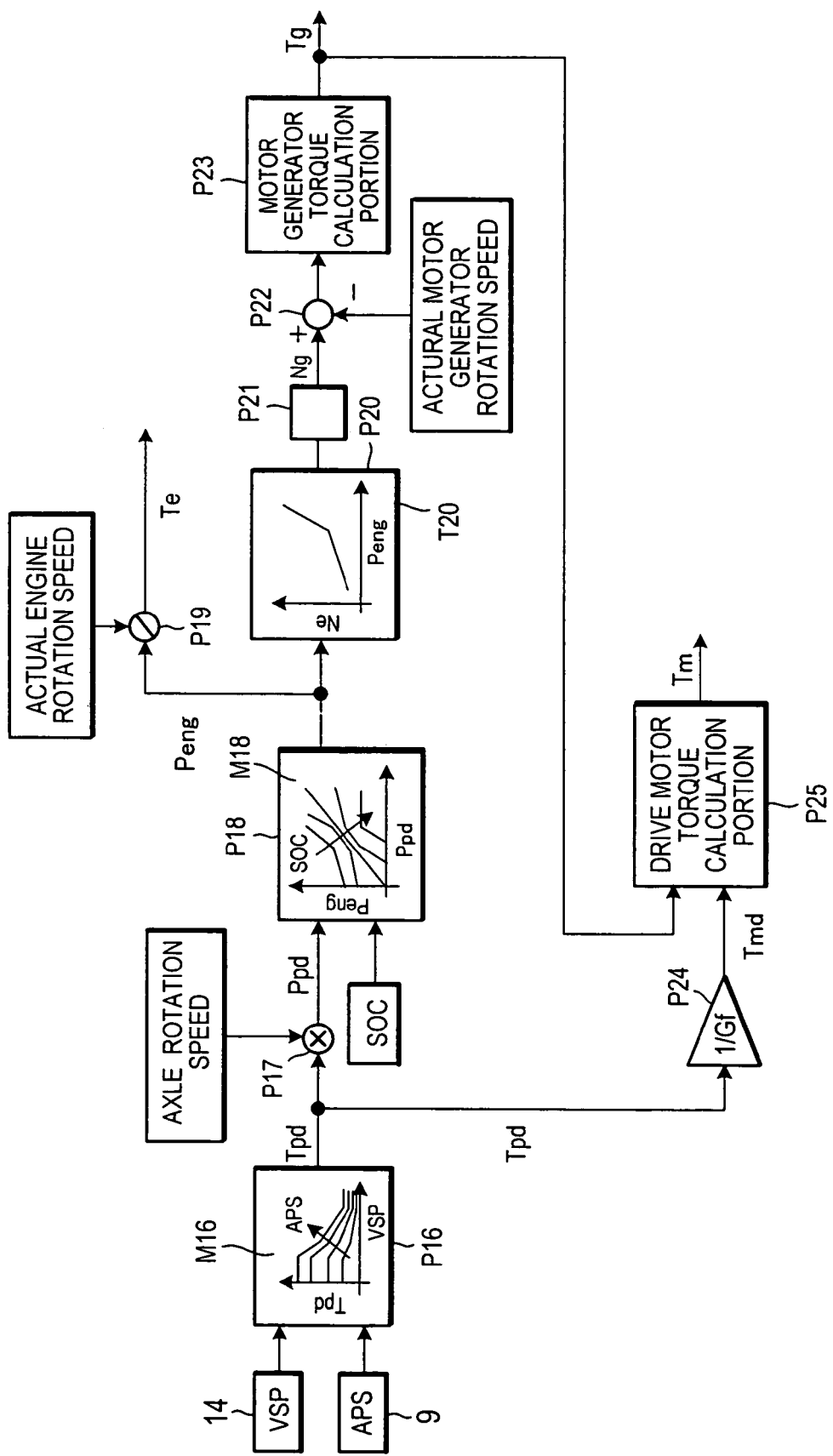
FIG. 9 is a functional block diagram of the control performed by an overall controller.

FIG. 9 is a block diagram of the control performed by the overall controller 80 of FIG. 6. Each control block executes calculations at fixed time intervals (10[msec], for example).

In a target axle torque calculation portion P16, a target axle drive torque Tpd is determined from the accelerator pedal depression amount APS detected by the accelerator sensor 9 and the vehicle speed VSP detected by the vehicle speed sensor 14 by referring to an axle drive torque map M16. The axle drive torque map M16 plots values obtained by multiplying a target driving power determined in advance for each accelerator depression amount APS and vehicle speed VSP by the radius of the drive wheels 13 and thus converting the target driving power into axle drive torque.

In a multiplication portion P17, an axle rotation speed determined from the vehicle speed VSP is multiplied by the target axle drive torque Tpd to determine a target driving power Ppd.

In a target engine power calculation portion P18, a target engine output Peng is determined in accordance with the charging state SOC of the battery 7 determined by the battery controller 81 and the target driving power Ppd by referring to a target engine output map M18.

A method of creating the target engine output map M18 will now be described. Initially, a case in which an arbitrary target driving power Ppd is output at an arbitrary vehicle speed will be considered. First, the fuel consumption rate per power unit when the charging power of the battery 7 is 0[kW] (direct distribution) is calculated. The fuel consumption rate per power unit [cc/kJ] in this case is as follows:

fuel consumption rate per power unit=(consumption rate of fuel consumed by engine [cc/sec])/(target driving power $Ppd$[kW]) (6)

Next, the fuel consumption rate per power unit is calculated successively from a battery charging power of 1[kW] to the maximum input power of the battery 7. The fuel consumption rate per power unit [cc/kJ] when charging the battery 7 is as follows:

$$\text{fuel consumption rate per power unit} = \frac{\text{(consumption rate of fuel consumed by engine [cc/sec])}}{\{(\text{target driving power } Ppd[\text{kW}]) + (\text{charging power to battery [kW]} \times \text{battery charging efficiency})\}} \quad (7)$$

The minimum fuel consumption rate per power unit value for each charging power and the operating point at that time are then determined.

Figure 10:
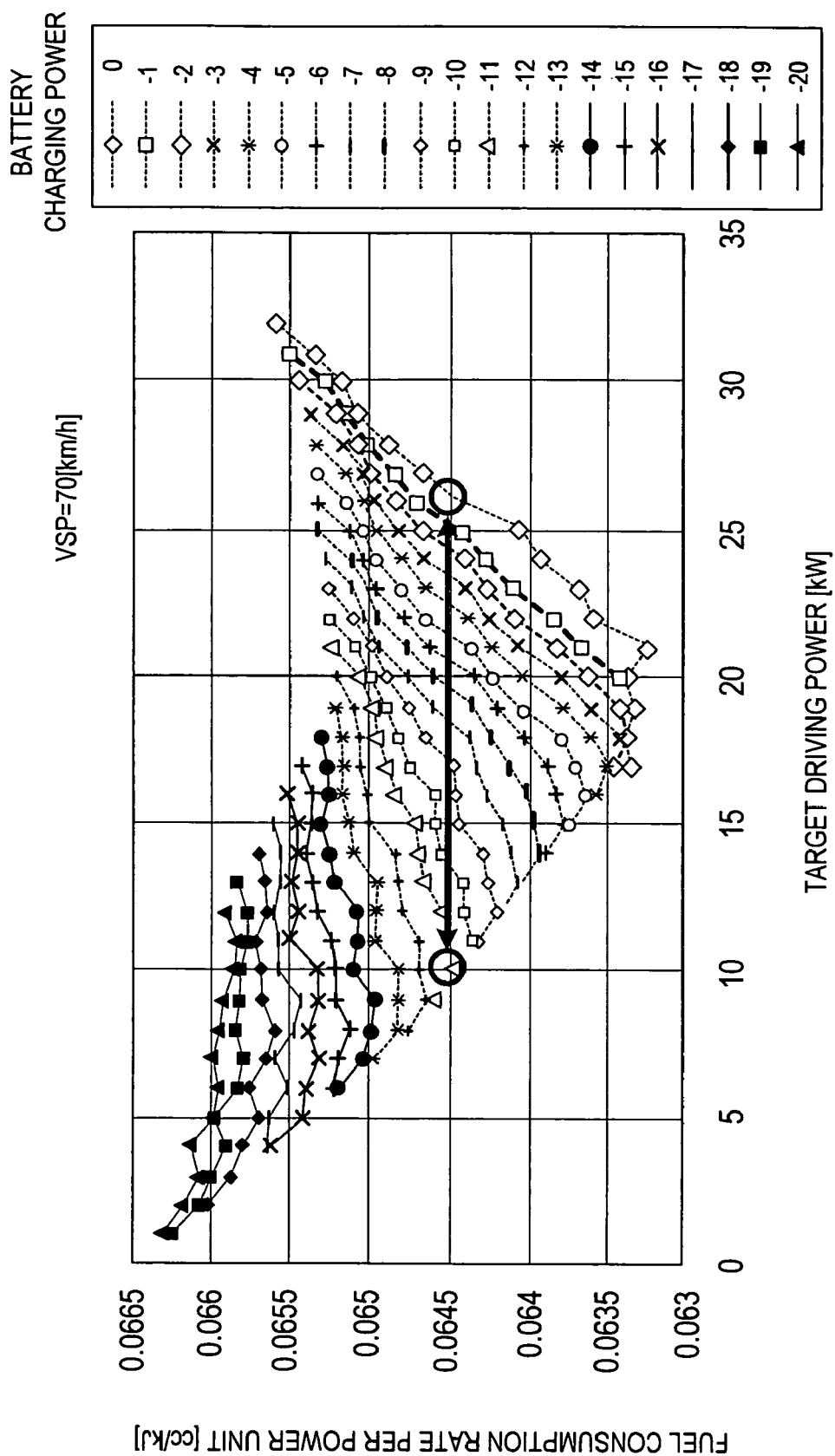
FIG. 10 is a graph showing the relationship between a target driving power and a fuel consumption rate per power unit.

FIG. 10 shows the operations described above calculated for all target driving power values at an arbitrary vehicle speed (70[km/h]. If the target fuel consumption rate is set at 0.0645[cc/kJ] according to FIG. 10, then the engine can be operated at the target fuel consumption rate by varying the charging power of the battery 7 within a target driving power range of between 10 and 26[kW]. In other words, if the target driving power is 10[kW], the fuel consumption rate equals the target fuel consumption rate at a charging power of 11[kW], and if the target driving power is 26[kW], the fuel consumption rate equals the target fuel consumption rate at a charging power of 0[kW].

By selecting an operating point at which the fuel consumption rate equals the target fuel consumption rate after the target fuel consumption rate has been set, the engine can be operated at the same fuel consumption rate per power unit at all times, even under different operating conditions.

Moreover, in this embodiment the target fuel consumption rate is set in accordance with the charging state SOC of the battery 7. When the battery charging state is good (storage amount is large), the target fuel consumption rate is set low (decreased) and the operating point is selected with priority on efficiency. Conversely, when the battery charging state is bad (storage amount is small), the target fuel consumption rate is set high (increased), and the operating point is selected with priority on charging power over efficiency. Instead of setting the target fuel consumption rate in accordance with the battery charging state SOC, the target fuel consumption rate may be set in accordance with running patterns by means of setting corresponding to navigation information or the driver.

If the target driving power is less than 10[kW] or no less than 26[kW] in FIG. 10, no operating point at which the fuel consumption rate equals the target fuel consumption rate exists even when the charging power is varied. Conventionally in such cases, when the target driving power is 5[kW], for example, the engine 1 is stopped and the vehicle is run by the drive motor 5 on the power of the battery 7. In a parallel hybrid vehicle such as that of this embodiment, however, taking loss in the drive motor 5 into consideration, the fuel consumption rate per power unit when the vehicle is run by the drive motor 5 using the power of the battery 7 is as follows:

$$\text{fuel consumption rate per power unit} = \{(\text{target driving power [kW]})/(\text{motor efficiency [\%]}) \times (\text{target fuel consumption rate [cc/kJ]})\}/(\text{target driving power [kW]}) \quad (8)$$

The fuel consumption rate falls below the target fuel consumption rate in accordance with the efficiency of the motor 5. In other words, an operating point at which the target fuel consumption rate is 0.0645 [cc/kJ] when the target driving power is 5[kW] does not exist in FIG. 10, and hence if the vehicle is run by the drive motor 5 on the power of the battery 7, the fuel consumption rate per power unit is worse than when the engine 1 is operated.

When no operating point at which the fuel consumption rate equals the target fuel consumption rate exists in FIG. 10, a comparison such as the following is performed.

First, the fuel consumption rate per power unit when the vehicle is run by the drive motor 5 using the power of the battery 7 is that of the above equation (8), i.e. {(target driving power [kW])/(motor efficiency [%])×(target fuel consumption rate [cc/kJ])}/(target driving power [kW]). Conversely, the fuel consumption rate per power unit when the vehicle is driven by the engine 1 is considered as being divided into the fuel consumption rate per power unit relating to the electric power for charging the battery 7, and the fuel consumption rate per power unit relating to driving power, and the fuel consumption rate per power unit relating to charging power is presumed to be equal to the target fuel consumption rate. In other words:

$$\text{fuel consumption rate relating to charging power [cc/sec]} = (\text{charging power [kW]}) \times (\text{target fuel consumption rate [cc/kJ]}) \quad (9)$$

Considering the charging power fuel consumption rate, the driving power fuel consumption rate is (overall fuel consumption rate [cc/sec])−(fuel consumption rate relating to charging power [cc/sec]), whereas the fuel consumption rate per power unit relating to driving power is {(overall fuel consumption rate [cc/sec])−(fuel consumption rate relating to charging power [cc/sec])}/(target driving power [kW]).

By comparing the fuel consumption rate per power unit relating to driving power thus determined to the fuel consumption rate per power unit when the vehicle is run by the drive motor 5 using the power of the battery 7, and selecting the smaller of the resulting values, fuel is not consumed for unnecessary charging, and motor loss generated when the vehicle is run by the motor using the power of the battery 7 can be reduced.

Figure 11:
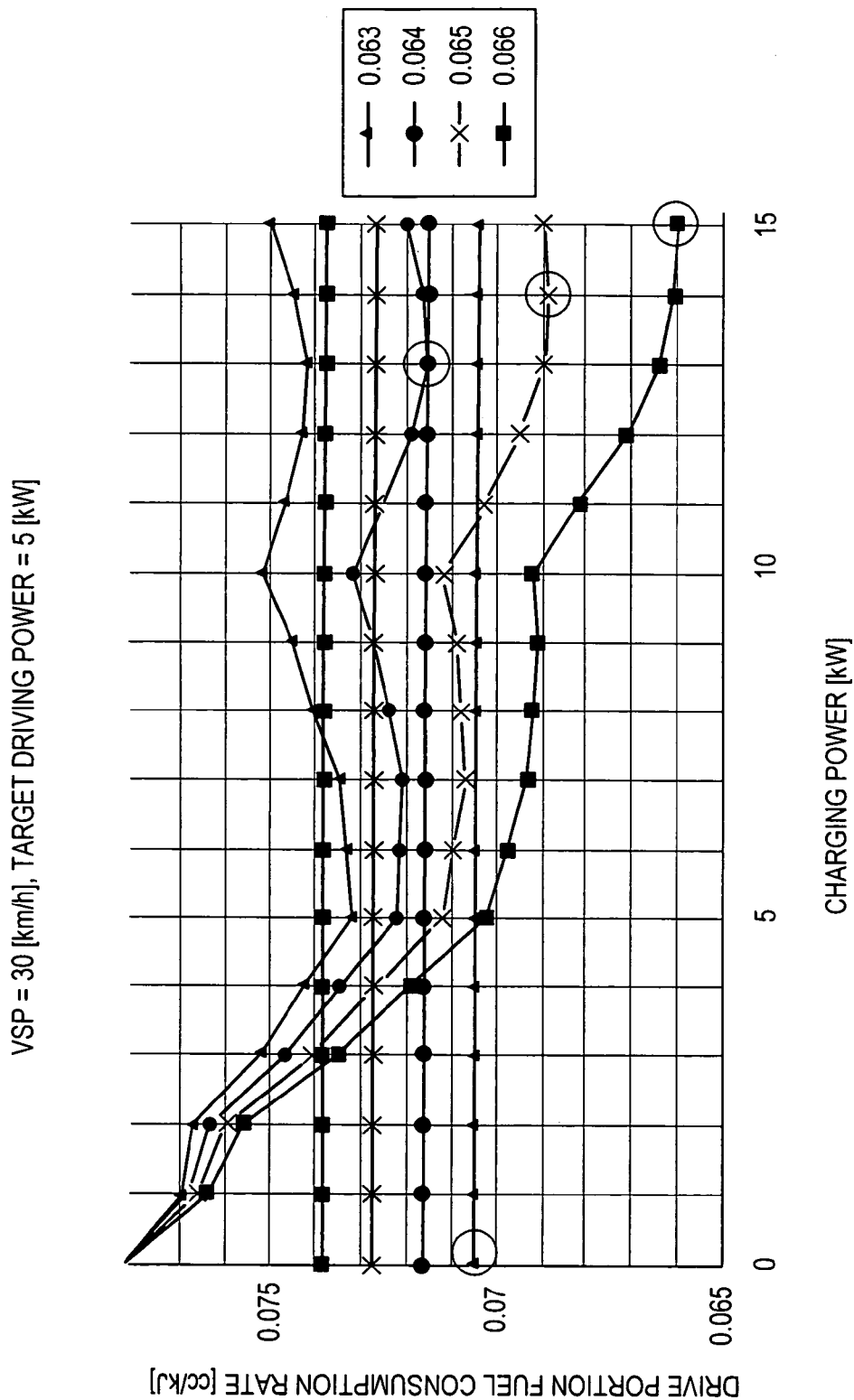
FIG. 11 is a graph showing the relationship between a charging power and a driving portion fuel consumption rate.

FIG. 11 shows the relationship between the driving portion fuel consumption rate and the charging power. The diagram illustrates a case in which the vehicle speed is 30[km/h] and the target driving power is 5[kW]. The plotting on the graph indicates the target fuel consumption rate. The polygonal lines show the fuel consumption rate per power unit relating to driving power determined according to this invention, and the horizontal lines show the fuel consumption rate per power unit when the vehicle is run by the drive motor 5 using the power of the battery 7.

In FIG. 11, when the target fuel consumption rate is 0.063[cc/kJ] (plotted by black triangles), the value of the fuel consumption rate per power unit when the vehicle is run by the drive motor 5 using the power of the battery 7, shown by the horizontal line, is smaller than the minimum value of the fuel consumption rate per power unit relating to driving power, shown by the polygonal line, and hence EV running, in which the vehicle is run by the drive motor 5 using the power of the battery 7, is selected.

On the other hand, when the target fuel consumption rate is no less than 0.065[cc/kJ], the minimum value of the fuel consumption rate per power unit relating to driving power, shown by the polygonal line, is smaller than the value of the fuel consumption rate per power unit when the vehicle runs by the motor using the power of the battery 7, shown by the horizontal line, and hence engine running, in which the vehicle is driven by the engine 1, is selected. As for the operating point at this time, the operating point (shown by the circles in FIG. 11) at which the fuel consumption rate per power unit relating to driving power reaches a minimum is selected.

In the description of this embodiment, the fuel consumption rate per power unit relating to charging power is set at the target fuel consumption rate, but fuel economy may be improved by using at least a smaller value than the actual fuel consumption rate at each of the operating points shown in FIG. 10 instead of a target fuel consumption rate. Further, the fuel consumption rate per power unit relating to charging power may be set at a larger value than the target fuel consumption rate. It should be noted, however, that in this case, the fuel economy improvement effect is reduced in comparison with a case in which the fuel consumption rate per power unit relating to charging power is set at the target fuel consumption rate.

The investigations described above are performed for all vehicle speeds and all target driving powers, and a target engine output is determined from the selected operating point, whereupon the target engine output map M18 of the target engine power calculation portion P18 in FIG. 9 is created.

The target engine output Peng determined in this manner is divided by the actual engine rotation speed of the engine 1 in a division portion P19 in FIG. 9, and thus an engine torque instruction value Te is determined. The engine torque instruction value Te is transmitted to the engine controller 83, and the engine controller 83 controls the throttle opening of the engine 1 on the basis of the torque instruction value Te to control the torque.

In an optimum fuel economy rotation speed determination portion P20, an optimum fuel economy engine rotation speed Ne is determined from an optimum fuel economy line table T20. The optimum fuel economy engine rotation speed Ne is a rotation speed for obtaining optimum fuel economy at the operating point of the engine 1 when the target engine output Peng is outputted. In a motor generator rotation speed determination portion P21, the optimum fuel economy engine rotation speed Ne is converted into a rotation speed of the motor generator 2 according to the relationship between m and n shown in the alignment chart of FIG. 8, and thus a motor generator rotation speed instruction value Ng is determined. In other words, the motor generator rotation speed instruction value Ng is as follows:

$$Ng = -\{m \cdot Nm - (m+n) \cdot Ne\}/n \qquad (10)$$

where Nm is the drive motor rotation speed.

The optimum fuel economy line table T20 may be determined when the target engine output map M16 of the target engine power calculation portion P18 is created. Depending on the system, it may be necessary to create different tables for each vehicle condition such as vehicle speed and so on.

In a calculation portion P22, the difference between the motor generator rotation speed instruction value Ng and the actual motor generator rotation speed rNg is calculated. In a motor generator torque calculation portion P23, a motor generator torque instruction value Tg at which the actual motor generator rotation speed equals the motor generator rotation speed instruction value is determined. The motor generator torque instruction value Tg is transmitted to the motor generator controller 82, whereby the torque of the motor generator 2 is vector controlled. The motor generator torque instruction value Tg may also be determined by PID control on the basis of the difference between the motor generator rotation speed instruction value Ng and the actual motor generator rotation speed rNg, which is calculated in the calculation portion P22.

In a target drive torque instruction value calculation portion P24, the target axle drive torque Tpd is divided by a gear ratio Gf of the final gear 12, and thus a target drive torque instruction value Tmd on the drive motor axle is determined.

Figure 8:
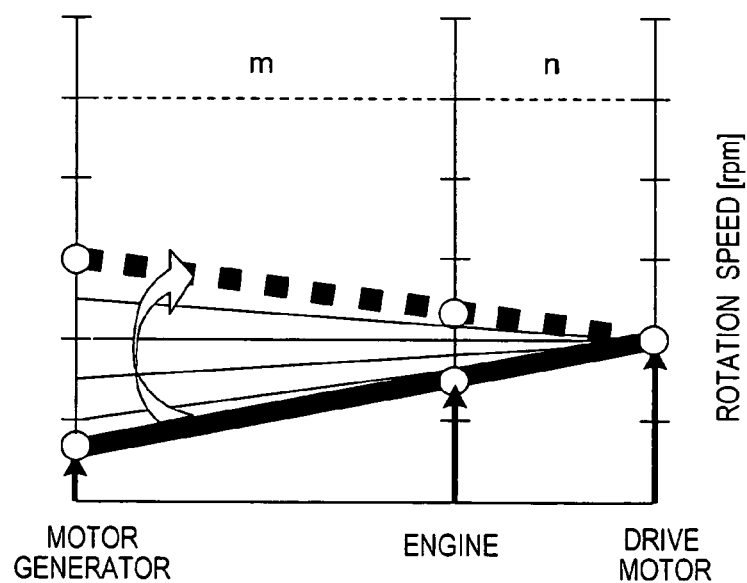
FIG. 8 is an alignment chat showing the relationship between the rotation speeds of a motor generator, an engine, and a drive motor connected to the planetary gear set.

In a drive motor torque calculation portion P25, a drive motor torque instruction value Tm is determined from the motor generator torque instruction value Tg and target drive torque instruction value Tmd in consideration of the torque balance in the alignment chart of FIG. 8 according to the following equation (11):

$$Tm = Tmd - (m/n) \cdot Tg \qquad (11)$$

The estimated torque of the motor generator 2 or the estimated torque of the engine 1 may be used instead of the motor generator torque instruction value Tg. If the estimated torque of the engine 1 is used, the drive motor torque instruction value Tm becomes $$Tm = Tmd - m/(m+n) \cdot Te' \qquad (12)$$

where Te' is the estimated torque.

The drive motor torque instruction value Tm is transmitted to the drive motor controller 84, and the drive motor controller 84 vector-controls the torque of the drive motor 5.

Hence in the second embodiment, when no operating point exists at which an equal fuel consumption rate to the target consumption rate can be realized, the fuel consumption rate relating to driving power is corrected with only the fuel consumption rate relating to the electric power for charging the battery 7 set at a predetermined value which is smaller than the actual fuel consumption rate. An operating point at which the fuel consumption rate relating to the driving power reaches a minimum is then selected, whereupon the engine 1, motor generator 2, and drive motor 5 are controlled to achieve this operating point. As a result, an operating point at which fuel economy is improved can be set even when no operating point exists at which an equal fuel consumption rate to the target consumption rate can be realized. An even better fuel economy improvement effect can be expected if a larger value than the target fuel consumption rate or an equal value to the target fuel consumption rate is used as the aforementioned predetermined value.

When the fuel consumption rate at the operating point thus selected is larger than the fuel consumption rate during EV running, then EV running is performed. In so doing, fuel economy can be improved even further.

Further, the charging state of the battery 7 might be detected, and the target fuel consumption rate might be set to a smaller value as the battery storage amount increases and to a larger value as the storage amount decreases. In so doing, the target fuel consumption rate is selected in accordance with the battery charging state, and thus fuel economy can be improved in various running modes.

Next, a third embodiment will be described.

The basic constitution of the third embodiment is identical to that of the second embodiment, and corresponds to the case described above in the second embodiment in which the vehicle speed is 0[km/h] and the target driving power is 0[N]. The difference between the second and third embodiments is that in the second embodiment, the charging power fuel consumption rate is adjusted to the target fuel consumption rate to determine the driving portion fuel consumption rate, and an operating point at which the driving portion fuel consumption rate reaches a minimum is selected, whereas in the third embodiment, an operating point at which the fuel consumption rate for realizing the operating point, rather than the driving portion fuel consumption rate, reaches a minimum is selected.

Considering a case in which 1[kW] is generated at an engine rotation speed of 1000[rpm], for example, if the fuel consumption rate and the target fuel consumption rate at this operating point are set at 2[cc/sec] and 1[cc/kJ] respectively, and the power generation portion (1[kW]) fuel consumption rate is considered as amount of generated power (1[kW])× target fuel consumption rate (1[cc/kJ])=1[cc/sec], then the remaining 1[cc/sec] (=fuel consumption rate at this operating point 2[cc/sec]−power generation portion fuel consumption rate) is determined as the rate at which fuel is consumed to realize the operating point, and the operating point at which this value reaches a minimum is selected.

It should be noted, however, that typically, power generation when the vehicle is stationary cannot be performed efficiently, and moreover noise and vibration must be suppressed, leading to a reduction in the power generation efficiency compared to the power generation when the vehicle is in motion. It is therefore desirable that power generation be restricted as much as possible while the vehicle is stationary in order to improve the fuel economy. However, power generation must be performed while the vehicle is stationary in order to manage the charging state of the battery 7 and to avoid deterioration in power performance due to a reduction in the outputtable power. When this embodiment is applied in such a case, an operating point is selected at which the fuel consumption rate for realizing the operating point reaches a minimum and noise and vibration are limited to an allowable range.

More specifically, when the battery is charged while the vehicle is stationary and an operating point exists at which an equal fuel consumption rate to the target fuel consumption rate can be realized, the engine 1 and motor generator 2 are controlled to achieve this operating point. When no operating point exists at which an equal fuel consumption rate to the target fuel consumption rate can be realized, a fuel consumption rate for realizing each operating point is determined with the fuel consumption rate relating to the charging power at each operating point set to a predetermined value which is smaller than the actual fuel consumption rate, and the operating point at which the fuel consumption rate reaches a minimum is selected. As a result, the fuel consumption rate can be suppressed even when power is generated while the vehicle is stationary. The predetermined value is preferably set to either a larger value than the target fuel consumption rate or an equal value to the target fuel consumption rate.

Further, the charging state of the battery 7 might be detected, and the target fuel consumption rate might be set to a smaller value as the battery storage amount increases and to a larger value as the storage amount decreases. In so doing, the target fuel consumption rate is selected in accordance with the battery charging state, and thus fuel economy can be improved in various running modes.

The entire contents of Japanese Patent Application P2003-131455 (filed May 9, 2003) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A parallel hybrid vehicle comprising:
   an engine and a drive motor capable of transmitting power to an output shaft;
   a transmission interposed between the output shaft and the engine;
   a battery device electrically connected to the drive motor; and
   a controller configured to:
   calculate a target driving power in accordance with an operating condition of the vehicle;
   calculate a fuel consumption rate per power unit at all possible operating points of the engine and drive motor to realize the target driving power;
   set a target fuel consumption rate on a basis of the vehicle operating condition;
   search for an operating point of the engine and drive motor at which a fuel consumption rate that is equal to the target fuel consumption rate can be realized;
   when an operating point at which a fuel consumption rate that is equal to the target fuel consumption rate can be realized has been found, control the engine and drive motor to achieve the operating point; and
   when an operating point at which a fuel consumption rate that is equal to the target fuel consumption rate can be realized is not found, correct the fuel consumption rate relating to driving power with only the fuel consumption rate relating to electric power for charging the battery device set at a predetermined value which is smaller than an actual fuel consumption rate, select an operating point at which the fuel consumption rate relating to driving power reaches a minimum, and control the engine and drive motor to achieve the selected operating point.

2. The vehicle as defined in claim 1, wherein the controller is further configured to stop the engine and drive the vehicle using the drive motor alone when the fuel consumption rate at the selected operating point is larger than the fuel consumption rate when the vehicle is run by the drive motor alone.

3. The vehicle as defined in claim 1, wherein the predetermined value is larger than the target fuel consumption rate.

4. The vehicle as defined in claim 1, wherein the predetermined value is equal to the target fuel consumption rate.

5. The vehicle as defined in claim 1, wherein the controller is further configured to reduce the target fuel consumption rate as storage amount of the battery device increases.

6. A parallel hybrid vehicle comprising:
   a transmission to which an engine and a motor generator are connected;
   a drive motor connected to an output shaft of the transmission or a drive shaft of the vehicle;
   a battery device which is electrically connected to the drive motor and the motor generator; and
   a controller configured to:
   calculate a target driving power in accordance with an operating condition of the vehicle;
   calculate a fuel consumption rate per power unit at all possible operating points of the engine, motor generator, and drive motor to realize the target driving power;
   set a target fuel consumption rate on a basis of the vehicle operating condition;

search for an operating point of the engine, motor generator, and drive motor at which a fuel consumption rate that is equal to the target fuel consumption rate can be realized;

when an operating point at which a fuel consumption rate that is equal to the target fuel consumption rate can be realized has been found, control the engine, motor generator, and drive motor to achieve the operating point; and when an operating point at which a fuel consumption rate that is equal to the target fuel consumption rate can be realized is not found, correct the fuel consumption rate relating to driving power with only the fuel consumption rate relating to electric power for charging the battery device set at a predetermined value which is smaller than an actual fuel consumption rate, select an operating point at which the fuel consumption rate relating to driving power reaches a minimum, and control the engine, motor generator, and drive motor to achieve the selected operating point.

7. The vehicle as defined in claim 6, wherein the controller is further configured to stop the engine and drive the vehicle using the drive motor alone when the fuel consumption rate at the selected operating point is larger than the fuel consumption rate when the vehicle is run by the drive motor alone.

8. The vehicle as defined in claim 6, wherein the transmission is a planetary gear set comprising a sun gear, a carrier, and a ring gear, and the engine, motor generator, and drive motor are connected to the sun gear, carrier, and ring gear respectively.

9. The vehicle as defined in claim 6, wherein the predetermined value is larger than the target fuel consumption rate.

10. The vehicle as defined in claim 6, wherein the predetermined value is equal to the target fuel consumption rate.

11. The vehicle as defined in claim 6, wherein the controller is further configured to reduce the target fuel consumption rate as storage amount of the battery device increases.

12. A parallel hybrid vehicle comprising:
a motor generator connected to an engine;
a battery device for storing electric power generated by the motor generator; and
a controller configured to:
calculate a fuel consumption rate per charging power unit at all possible operating points of the engine and motor generator when the vehicle is stationary;
set a target fuel consumption rate on a basis of an operating condition of the vehicle;
search for an operating point of the engine and motor generator at which a fuel consumption rate that is equal to the target fuel consumption rate can be realized;
when an operating point at which a fuel consumption rate that is equal to the target fuel consumption rate can be realized has been found, control the engine and motor generator to achieve the operating point; and
when an operating point at which a fuel consumption rate that is equal to the target fuel consumption rate can be realized is not found, determine a fuel consumption rate for realizing each operating point with the fuel consumption rate relating to the charging power at each operating point set at a predetermined value which is smaller than an actual fuel consumption rate, select an operating point at which the fuel consumption rate reaches a minimum, and control the engine and motor generator to achieve the selected operating point.

13. The vehicle as defined in claim 12, wherein the predetermined value is larger than the target fuel consumption rate.

14. The vehicle as defined in claim 12, wherein the predetermined value is equal to the target fuel consumption rate.

15. The vehicle as defined in claim 12, wherein the controller is further configured to reduce the target fuel consumption rate as storage amount of the battery device increases.

16. A parallel hybrid vehicle comprising:
an engine and a drive motor capable of transmitting power to an output shaft;
a transmission interposed between the output shaft and the engine;
a battery device electrically connected to the drive motor;
means for calculating a target driving power in accordance with an operating condition of the vehicle;
means for calculating a fuel consumption rate per power unit at all possible operating points of the engine and drive motor to realize the target driving power;
means for setting a target fuel consumption rate on a basis of the vehicle operating condition;
means for searching for an operating point of the engine and drive motor at which a fuel consumption rate that is equal to the target fuel consumption rate can be realized;
means for, when an operating point at which a fuel consumption rate that is equal to the target fuel consumption rate can be realized has been found, controlling the engine and drive motor to achieve the operating point; and
means for, when an operating point at which a fuel consumption rate that is equal to the target fuel consumption rate can be realized is not found, correcting the fuel consumption rate relating to driving power with only the fuel consumption rate relating to electric power for charging the battery device set at a predetermined value which is smaller than an actual fuel consumption rate, selecting an operating point at which the fuel consumption rate relating to driving power reaches a minimum, and controlling the engine and drive motor to achieve the selected operating point.

17. A parallel hybrid vehicle comprising:
a transmission to which an engine and a motor generator are connected;
a drive motor connected to an output shaft of the transmission or a drive shaft of the vehicle;
a battery device which is electrically connected to the drive motor and the motor generator;
means for calculating a target driving power in accordance with an operating condition of the vehicle;
means for calculating a fuel consumption rate per power unit at all possible operating points of the engine, motor generator, and drive motor to realize the target driving power;
means for setting a target fuel consumption rate on a basis of the vehicle operating condition;
means for searching for an operating point of the engine, motor generator, and drive motor at which a fuel consumption rate that is equal to the target fuel consumption rate can be realized;

means for, when an operating point at which a fuel consumption rate that is equal to the target fuel consumption rate can be realized has been found, controlling the engine, motor generator, and drive motor to achieve the operating point; and means for, when an operating point at which a fuel consumption rate that is equal to the target fuel consumption rate can be realized is not found, correcting the fuel consumption rate relating to driving power with only the fuel consumption rate relating to electric power for charging the battery device set at a predetermined value which is smaller than an actual fuel consumption rate, selecting an operating point at which the fuel consumption rate relating to driving power reaches a minimum, and controlling the engine, motor generator, and drive motor to achieve the selected operating point.

18. A parallel hybrid vehicle comprising:

a motor generator connected to an engine;

a battery device for storing electric power generated by the motor generator;

means for calculating a fuel consumption rate per charging power unit at all possible operating points of the engine and motor generator when the vehicle is stationary;

means for setting a target fuel consumption rate on a basis of an operating condition of the vehicle;

means for searching for an operating point of the engine and motor generator at which a fuel consumption rate that is equal to the target fuel consumption rate can be realized;

means for, when an operating point at which a fuel consumption rate that is equal to the target fuel consumption rate can be realized has been found, controlling the engine and motor generator to achieve the operating point; and means for, when an operating point at which a fuel consumption rate that is equal to the target fuel consumption rate can be realized is not found, determining a fuel consumption rate for realizing each operating point with the fuel consumption rate relating to the charging power at each operating point set at a predetermined value which is smaller than an actual fuel consumption rate, selecting an operating point at which the fuel consumption rate reaches a minimum, and controlling the engine and motor generator to achieve the selected operating point.

* * * * *